(12) United States Patent
Yoo et al.

(10) Patent No.: US 11,277,576 B2
(45) Date of Patent: Mar. 15, 2022

(54) DISPLAY APPARATUS AND CONTROL METHOD THEREOF

(71) Applicant: Samsung Electronics Co., Ltd., Suwon-si (KR)

(72) Inventors: Hojune Yoo, Suwon-si (KR); Kwanyoung Kim, Suwon-si (KR); Dongwook Kim, Suwon-si (KR); Jungseop Kim, Suwon-si (KR); Seungil Yoon, Suwon-si (KR); Jaemyung Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 16/591,109

(22) Filed: Oct. 2, 2019

(65) Prior Publication Data

US 2020/0112695 A1 Apr. 9, 2020

(30) Foreign Application Priority Data

Oct. 4, 2018 (KR) .................. 10-2018-0118208

(51) Int. Cl.
*H04N 5/33* (2006.01)
*H04N 5/44* (2011.01)
(Continued)

(52) U.S. Cl.
CPC ......... *H04N 5/33* (2013.01); *H04N 21/42204* (2013.01); *H04N 21/42221* (2013.01)

(58) Field of Classification Search
CPC ...... H04N 5/33; H04N 5/44; H04N 21/42204; H04N 21/42221; H04B 10/00;
(Continued)

(56) References Cited

U.S. PATENT DOCUMENTS

2009/0024865 A1 1/2009 Fugaro et al.
2010/0072351 A1* 3/2010 Mahowald ............... G01J 1/02
250/2 UAL (Continued)

FOREIGN PATENT DOCUMENTS

KR 10-0770415 B1 10/2007

OTHER PUBLICATIONS

International Search Report and Written Opinion of the International Searching Authority (Forms PCT/ISA/210 and PCT/ISA/237); dated Feb. 4, 2020 in International Application No. PCT/KR2019/013052.

(Continued)

*Primary Examiner* — Chanh D Nguyen
*Assistant Examiner* — Nguyen H Truong
(74) *Attorney, Agent, or Firm* — Staas & Halsey, LLP

(57) ABSTRACT

Disclosed are a display apparatus and a method of controlling the same. a display apparatus including: a display; an optical sensor; and a processor configured to: identify an operation cycle shorter than an idle section of an infrared (IR) signal and including at least a part of a section for a detection operation of the optical sensor, based on the IR signal of which a signal section corresponding to a user key input and the idle section are repeated on a predetermined cycle, control the optical sensor to repetitively perform the detection operation on the identified operation cycle, and perform a predetermined operation based on a detection value obtained by the detection operation of the optical sensor.

19 Claims, 16 Drawing Sheets

(51) Int. Cl.
*G01J 1/42* (2006.01)
*H04N 21/422* (2011.01)
(58) Field of Classification Search
CPC ........ H04B 10/06; H04B 10/69; G08C 19/16; H05B 37/02; G09G 5/08
See application file for complete search history.

(56) References Cited

U.S. PATENT DOCUMENTS

| | | |
|---|---|---|
| 2010/0220109 A1 | 9/2010 | Aoki et al. |
| 2012/0026408 A1 | 2/2012 | Lee et al. |
| 2012/0153153 A1* | 6/2012 | Chang ..................... G01C 3/08 250/338.1 |
| 2015/0347006 A1* | 12/2015 | Kadomatsu ......... G06F 3/04886 715/773 |
| 2018/0040239 A1 | 2/2018 | Hur |
| 2019/0080668 A1* | 3/2019 | Holenarsipur ........... G09G 5/10 |

OTHER PUBLICATIONS

Extended European Search Report dated Aug. 6, 2021, in European Application No. 19869052.1.

* cited by examiner

DISPLAY APPARATUS AND CONTROL METHOD THEREOF

CROSS-REFERENCE TO RELATED THE APPLICATION

This application is based on and claims priority under 35 U.S.C. § 119 to Korean Patent Application No. 10-2018-0118208 filed on Oct. 4, 2018 in the Korean Intellectual Property Office, the disclosure of which is incorporated by reference herein in its entirety.

BACKGROUND

Field

The disclosure relates to a display apparatus and a method of controlling the same, and more particularly to a display apparatus providing a function based on an optical sensor and a method of controlling the same.

Description of the Related Art

A television (TV), an electronic frame, or the like display apparatus has increasingly employed an optical sensor such as an illumination sensor, a color sensor, etc. to provide automatic brightness control or the like function.

In addition, technology of remotely controlling the display apparatus through a remote controller based on an infrared (IR) signal has universally been used. However, when a user controls the display apparatus having the optical sensor through the remote controller, a problem may arise in that the IR signal emitted from the remote controller causes malfunction of the optical sensor. In terms of providing the function using the optical sensor, the optical sensor may detect the IR signal emitted from the remote controller even though the IR signal is not intended to be detected.

When the display apparatus provides an IR blaster function or multi brand remote-control (MBR) function, such a problem becomes serious. The reasons are as follows. To provide the IR blaster or MBR function, the display apparatus has to include a built-in IR light emitting diode (LED) for emitting the IR signal. However, the IR signal emitted from the built-in IR LED may have an influence on the optical sensor provided in the display apparatus at a closer range. When the IR LED for the IR blaster and the optical sensor are designed as a single body or to be positioned in one module, the problem becomes more serious.

SUMMARY

An aspect of one or more exemplary embodiments is to provide a display apparatus of which a function based on an optical sensor is normally implemented even though an IR signal is given corresponding to a user key input.

According to an exemplary embodiment, there is provided a display apparatus including: a display; an optical sensor; and a processor configured to: identify an operation cycle shorter than an idle section of an infrared (IR) signal and including at least a part of a section for a detection operation of the optical sensor, based on the IR signal of which a signal section corresponding to a user key input and the idle section are repeated on a predetermined cycle, control the optical sensor to repetitively perform the detection operation on the identified operation cycle, and perform a predetermined operation based on a detection value obtained by the detection operation of the optical sensor.

Thus, it is convenient for a user to use the display apparatus because the functions based on the optical sensor of the display apparatus are normally implemented even while the user is using the remote controller to control the display apparatus.

The processor may be configured to identify the operation cycle to be shorter than or equal to half of the idle section of the IR signal.

Thus, the optical sensor can perform the detection operation within the idle section of the IR signal at least once even though the operation cycle of the optical sensor is varied at any point in time.

The processor may be configured to perform a predetermined operation based on a detection value lower than or equal to a predetermined value among the obtained detection values.

The display apparatus may further include an IR emitter, and the processor may be configured to identify the operation cycle based on information about a signal emitted from the IR emitter.

Thus, the display apparatus with the built-in IR emitter can correctly identify information about the IR signal corresponding to the user key input, and is improved in reliability of identifying the operation cycle to be changed for the optical sensor.

The processor may be configured to identify the operation cycle based on results of detecting the signal section and the idle section of the IR signal through the optical sensor.

Thus, it is possible to identify the operation cycle to be changed for the optical sensor even though the IR signal corresponding to the user key input is received from the outside of the display apparatus.

The processor may be configured to perform a predetermined operation based on a value obtained as the detection value obtained by the optical sensor is compensated based on the identified operation cycle.

Thus, the function of the display apparatus using the optical sensor may be continuously provided even though the operation cycle of the optical sensor is varied.

The processor may be configured to control the optical sensor to perform the detection operation on an original operation cycle based on finished reception of the IR signal.

Thus, it is possible to return to the original operation cycle of the optical sensor when the emission of the IR signal corresponding to the user key input is finished, thereby improving the reliability in the detection operation of the optical sensor.

The processor may be configured to identify the operation cycle while stepwise changing the operation cycle of the optical sensor.

Thus, it is possible to change the operation cycle of the optical sensor into a proper cycle without identifying the idle section of the IR signal corresponding to the user key input, and make the operation cycle of the optical sensor be suitable for situations.

The processor may be configured to perform a predetermined operation by differently compensating the detection value obtained by the optical sensor in accordance with purposes of using the optical sensor.

Thus, the detection value of the optical sensor is compensated to be more adapted to the purpose of the optical sensor, thereby enhancing satisfaction of a user.

According to an exemplary embodiment, there is provided a method of controlling a display apparatus with an optical sensor, the method including: identifying an operation cycle shorter than an idle section of an infrared (IR) signal and including at least a part of a section for a detection operation of the optical sensor, based on the IR signal of which a signal section corresponding to a user key input and the idle section are repeated on a predetermined cycle; controlling the optical sensor to repetitively perform the detection operation on the identified operation cycle; and performing a predetermined operation based on a detection value obtained by the detection operation of the optical sensor.

The identifying of the operation cycle may include identifying the operation cycle to be shorter than or equal to half of the idle section of the IR signal.

The performing of the predetermined operation may include performing a predetermined operation based on a detection value lower than or equal to a predetermined value among the obtained detection values.

The display apparatus may further include an IR emitter, and the identifying of the operation cycle may include identifying the operation cycle based on information about a signal emitted from the IR emitter.

The identifying of the operation cycle may include identifying the operation cycle based on results of detecting the signal section and the idle section of the IR signal through the optical sensor.

The performing of the predetermined operation may include performing a predetermined operation based on a value obtained as the detection value obtained by the optical sensor is compensated based on the identified operation cycle.

The controlling of the optical sensor may include controlling the optical sensor to perform the detection operation on an original operation cycle based on finished reception of the IR signal.

The identifying of the operation cycle may include identifying the operation cycle while stepwise changing the operation cycle of the optical sensor.

The performing of the predetermined operation may include performing a predetermined operation by differently compensating the detection value obtained by the optical sensor in accordance with purposes of using the optical sensor.

According to an exemplary embodiment, there is provided a computer program combined to a display apparatus and stored in a medium to implement an above-disclosed method.

The computer program may be stored in a medium of a server and downloadable into the display apparatus through a network.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
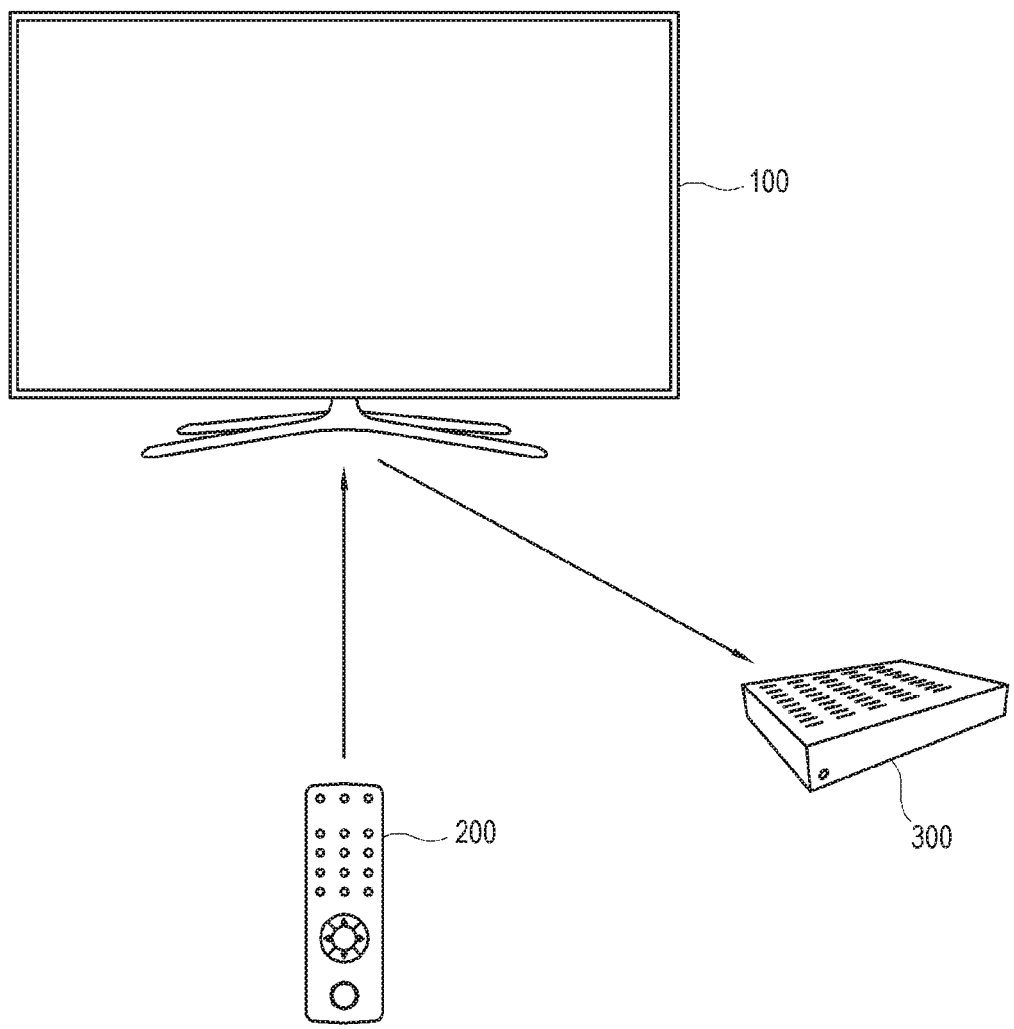
FIG. 1 is a schematic diagram showing control flow among a display apparatus according to an embodiment of the disclosure, a remote controller, and an electronic apparatus.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, in the following exemplary embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 illustrates a display apparatus according to an embodiment of the disclosure. The display apparatus 100 according to an embodiment of the disclosure may for example be actualized by a television (TV). Further, a display apparatus 100 according to another embodiment of the disclosure may for example be actualized by an electronic frame, a digital billboard, a large format display (LFD), a digital signage, a smartphone, a tablet computer, a mobile phone, a smartwatch, a head-mounted display or the like wearable device, a computer, a multimedia player, a set-top box, a smart refrigerator, or the like apparatus capable of outputting an image based on content. However, the display apparatus 100 according to an embodiment of the disclosure is not limited to these embodiments, and may include any apparatus capable of displaying an image.

A user of the display apparatus 100 according to an embodiment of the disclosure may remotely control the display apparatus 100 through a remote controller 200. The remote controller 200 may employ an infrared (IR) signal to transmit a control command to the display apparatus 100.

When the display apparatus 100 according to an embodiment of the disclosure support a multi brand remote-control (MBR) function, a user may use one remote controller 200 to control other electronic apparatuses 300 as well as the display apparatus 100. For example, a user of the display apparatus 100 presses a button for controlling a set-top box 300 through the remote controller 200, the display apparatus 100 receives a control signal from the remote controller 200 and identifies the received control signal as a signal for controlling the set-top box 300, thereby delivering an IR signal for controlling the set-top box 300 to the set-top box 300. To this end, the display apparatus 100 may include an IR emitter (or IR LED) capable of generating and emitting an IR signal.

Figure 2:
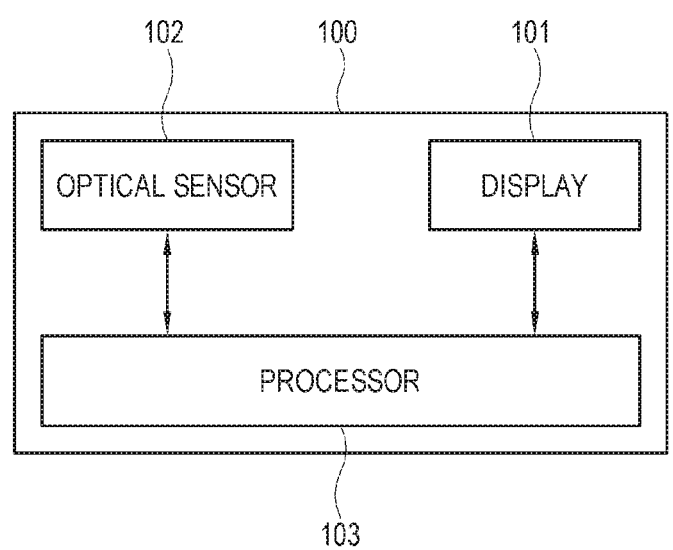
FIG. 2 is a block diagram of a display apparatus according to an embodiment of the disclosure.

FIG. 2 is a block diagram of a display apparatus according to an embodiment of the disclosure. The display apparatus 100 according to one embodiment of the disclosure includes a display 101, an optical sensor 102, and a processor 103. However, the configuration of the display apparatus 100 shown in FIG. 2 is merely an example, and the display apparatus according to one embodiment of the disclosure may be actualized by alternative elements. In other words, the display apparatus according to one embodiment of the disclosure may include other elements in addition to the configuration shown in FIG. 2 or exclude some elements from the configuration shown in FIG. 2.

The display 101 may display an image. The display 101 may be actualized without limitations, for example, may be actualized by various display methods, such as liquid crystal, plasma, a light emitting diode LED, an organic light emitting diode OLED, a surface-conduction electron-emitter, a carbon nano-tube, nano-crystal, etc. In case of the liquid crystal method, the display 101 includes a liquid crystal display (LCD) panel, a backlight unit for supplying light to the LCD panel, a panel driver for driving the LCD panel, etc. Alternatively, the display 101 may be actualized by an OLED panel that can emit light in itself without the backlight unit.

The optical sensor 102 may detect light around the display apparatus 100 and output a corresponding detection value. The optical sensor 102 may include an illumination sensor, a color sensor, etc. Thus, the optical sensor 102 can detect illumination around the display apparatus 100, brightness, the kind of illumination, color temperature, etc. However, the optical sensor 102 is not limited to this purpose of use, and may include any sensor as long as it can detect light and output information about the light.

The processor 103 may process an image signal. There are no limits to the kinds of image processing processes performed by the processor 103. For example, the image processing performed by the processor 103 may include demultiplexing for dividing an input stream into sub streams of video, audio and appended data; decoding corresponding to an image format of an image stream; deinterlacing for converting an interlaced type of an image stream into a progressive type; scaling for adjusting an image stream to have a preset resolution; noise reduction for improving image quality; detail enhancement; frame refresh rate conversion; etc.

The processor 103 may perform control for operating general elements of the display apparatus 100. The processor 103 may execute a control program (or instruction). In this case, the display apparatus 100 may further include a nonvolatile memory in which the control program is installed, and a volatile memory in which at least a part of the installed control program is loaded. Further, the control program may be stored in an electronic apparatus other than the display apparatus 100.

The control program may include a program(s) achieved in the form of at least one of a basic input/output system (BIOS), a device driver, an operating system, firmware, a platform, and an application program. According to one embodiment, the application program may be previously installed or stored in the display apparatus 100 when the display apparatus 100 is manufactured, or may be installed in the display apparatus 100 on the basis of application program data received from the outside when used in the future. The application data may be for example downloaded from an application market and the like external server to the display apparatus 100, but not limited thereto. Meanwhile, the processor 103 may be actualized in the form of a device, an S/W module, a circuit, a chip, or combination thereof. Below, operation of executing and implementing the control program by the processor 101 according to an embodiment of the disclosure may for convenience be described as operation of the processor 103 without mentioning the control program.

The processor 103 may for example control the optical sensor 102 so that the optical sensor 102 can detect light. Further, the processor 103 may perform a predetermined process with regard to a value detected by the optical sensor 102, and control operation of the display 101 based on the value detected by the optical sensor 102 and the like. In the display apparatus 100 shown in FIG. 2, both the process and control are performed in one processor 103. However, this is merely an example, and a display apparatus according to an alternative embodiment of the disclosure may include a separate controller in addition to the processor.

Figure 9:
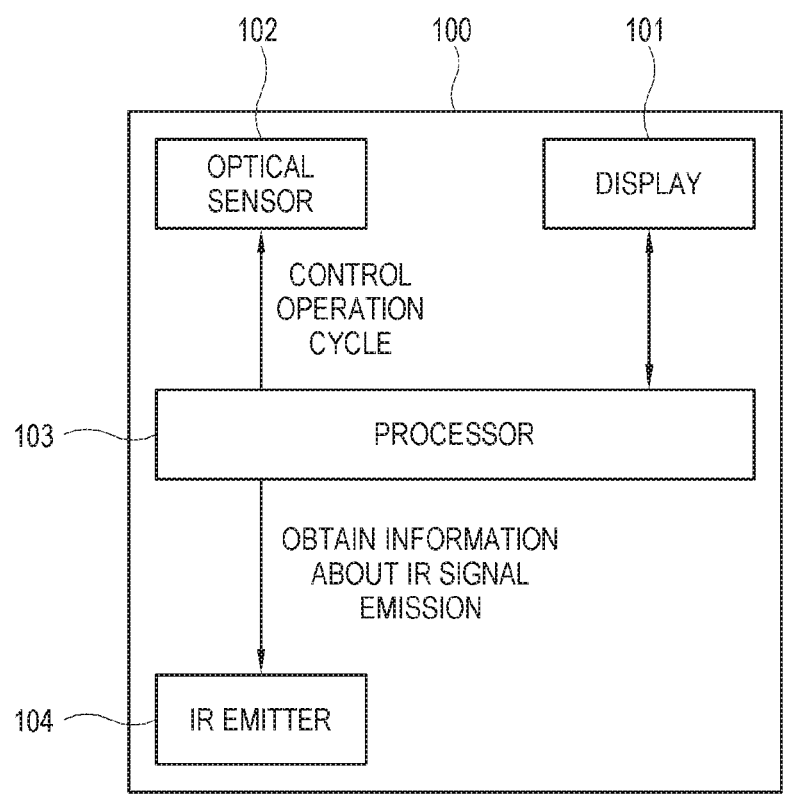

The display apparatus 100 according to an embodiment of the disclosure may further include an IR emitter 104 (see FIG. 9). The IR emitter 104 may generate and emit an IR signal. In particular, the IR emitter 104 may generate the IR signal for controlling other electronic apparatus 300, and transmit the generated IR signal to other electronic apparatuses 300. The IR emitter 104 may be actualized by the IR LED or the like, but not limited to this embodiment.

Figure 3:
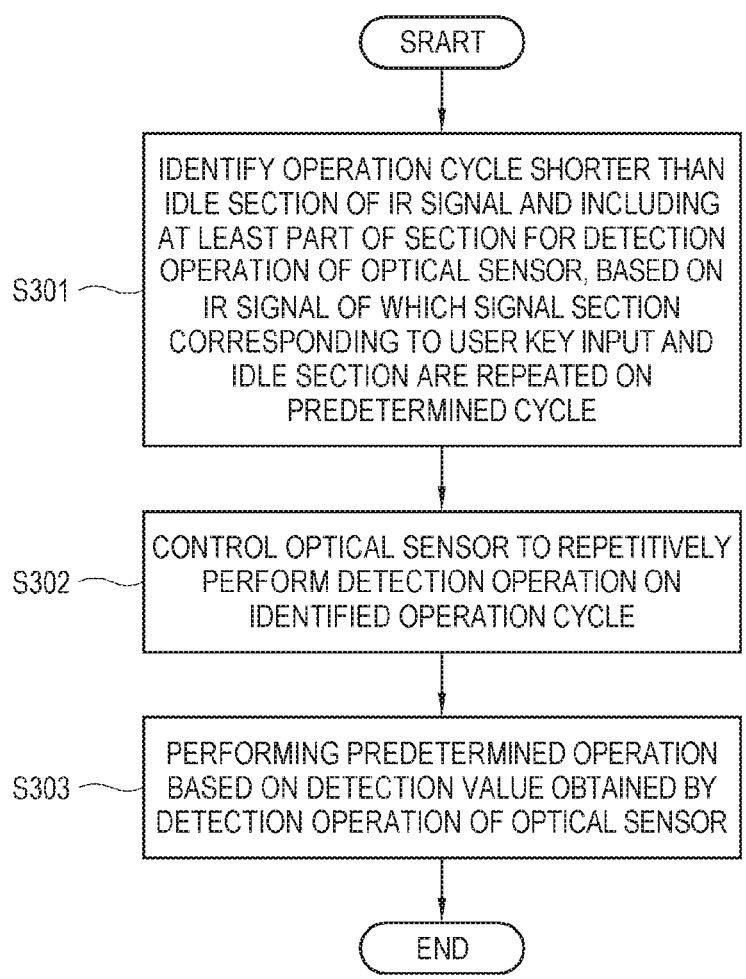
FIG. 3 is a flowchart showing operation of a display apparatus according to an embodiment of the disclosure.

FIG. 3 is a flowchart showing operation of a display apparatus according to an embodiment of the disclosure.

The processor 103 of the display apparatus 100 according to an embodiment of the disclosure identifies an operation cycle, which is shorter than an idle section of the IR signal and includes at least a part of a section in which a detection operation of the optical sensor 102 will be performed, in response to the IR signal of which the idle section and a signal section indicating a user key input are repeated on a predetermined cycle (S301).

Here, the user key input refers to a user's input made as the user presses a button of the remote controller 200 or touches a touch panel or touch button provided in the remote controller 200, and issued to control the display apparatus 100 or the electronic apparatus 300. When such a user key input is received or detected, the IR emitter 104 of the remote controller 200 and/or the display apparatus 100 emits a corresponding IR signal. In other words, the IR signal corresponding to the user key input may be a signal emitted from the remote controller 200 toward the display apparatus 100, or may be a signal emitted from the IR emitter 104 toward the electronic apparatus 300 when the display apparatus 100 includes the built-in IR emitter 104 to provide the MBR function or the like.

The IR signal has the signal section and the idle section. Here, the signal section indicates a section corresponding to 'ON' of the IR signal or a section corresponding to a signal encoded corresponding to the user key input, and the idle section indicates the other section, i.e. a section corresponding to 'OFF' of the IR signal. For example, when the signal emitted from the remote controller 200 toward the display apparatus 100 is as shown in the graph 510 of FIG. 5, the sections 501 and 503 correspond to the signal section and the section 502 corresponds to the idle section. Alternatively, when a plurality of consistent unit signals are sequentially transmitted with regard to one user key input, a section corresponding to each unit signal is the signal section and a section corresponding to time between the unit signals is the idle section.

At least a part of the section, in which the detection operation of the optical sensor 102 will be performed, refers to a minimal length of the operation cycle in which the optical sensor 102 can detect light according to purposes of use and obtain a corresponding detection value. Here, the operation cycle of the optical sensor 102 refers to time to be taken in performing the detection operation, i.e. a so-called unit detection operation needed for obtaining one detection value while the optical sensor 102 continuously and iteratively performs the detection operation. For example, in a case where the optical sensor 102 is an illumination sensor, at least a part of the section in which the detection operation of the illumination sensor will be performed refers to a minimal length of the operation cycle in which the illumination sensor can detect light around the display apparatus 100 and obtain a corresponding illumination value. At least a part of the section in which the detection operation of the optical sensor 102 will be performed may be varied in length depending on the kinds or use purposes of the optical sensor 102.

In other words, when it is identified that the IR signal indicating the user key input has been received or will be received, the processor 103 identifies the signal section and idle section of the IR signal, and identifies an operation cycle of the optical sensor 102, which is shorter than the idle section of the IR signal but longer than at least the part of the section for the detection operation of the optical sensor 102, based on the signal section and the idle section. Further, the processor 103 may identify the operation cycle to be shorter than or equal to half of the idle section of the IR signal. Thus, the optical sensor 102 can perform the detection operation within the idle section of the IR signal at least once even though the operation cycle of the optical sensor 102 is varied at any point in time. A detailed method of identifying the operation cycle will be described later with reference to FIGS. 4 and 5.

After identifying the operation cycle of the optical sensor 102 as described above, the processor 103 controls the optical sensor 102 to repetitively perform the detection operation based on the identified operation cycle (S302). That the operation cycle is identified in the foregoing operation S301 in response to the IR signal corresponding to the user key input made while the optical sensor 102 is operating on a predetermined operation cycle and the optical sensor 102 is controlled to repetitively perform the detection operation based on the identified operation cycle. Therefore, the operation cycle of the optical sensor 102 is changed from an operation cycle being used prior to the IR signal corresponding to the user key input having been emitted, thereby making the optical sensor 102 operate on a new corresponding operation cycle.

Then, the processor 103 performs a predetermined operation or controls the display apparatus 100 to perform the predetermined operation based on the detection value obtained by the detection operation of the optical sensor 102 varied in the operation cycle as described above (S303). Here, the predetermined operation may include any operation as long as it is related to the display apparatus 100, and there are no specific limits to the kinds or content of the operation. For example, in a case where the optical sensor 102 is the illumination sensor, the processor 103 may perform operation to change the brightness of the display 101 based on an illumination value obtained by the illumination sensor. Alternatively, in a case where the optical sensor 102 is a color sensor, the processor 103 may identify the kind or color temperature of a light source around the display apparatus 100 based on the detection value obtained by the color sensor, and perform the operation to change the color or the like of the display 101.

Figure 4:
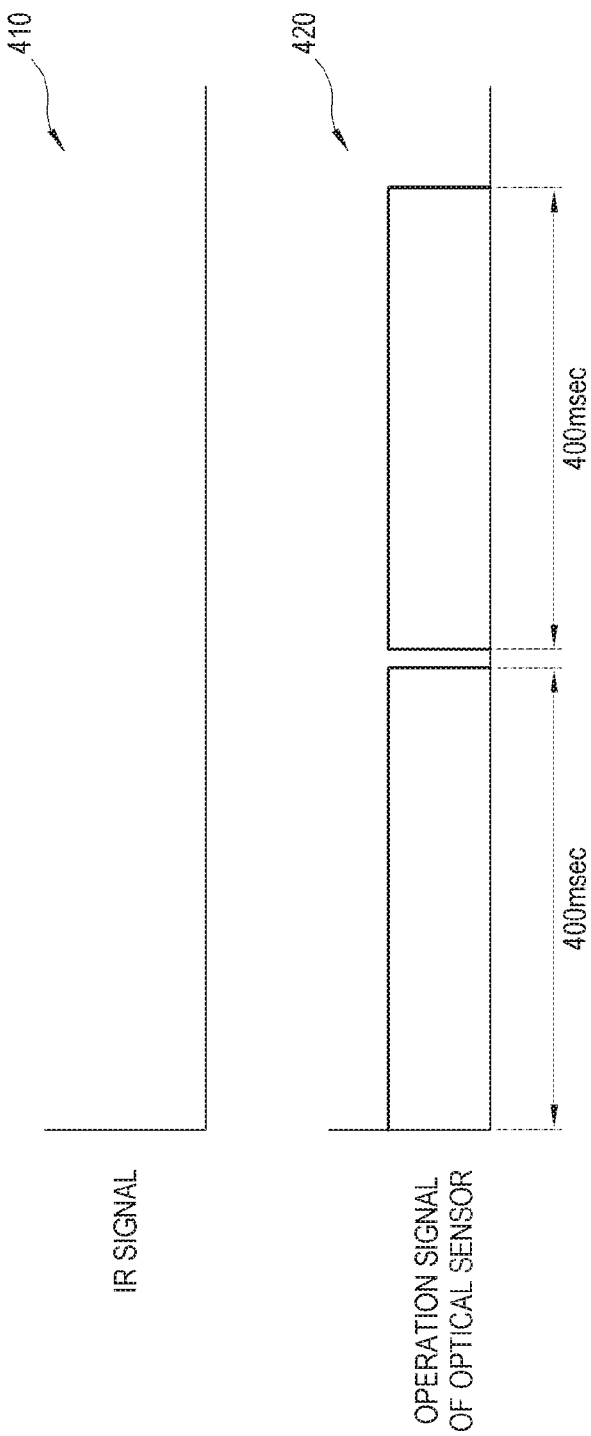
FIGS. 4 and 5 show examples that operation signals of an optical sensor are varied depending on an infrared (IR) signal in a display apparatus according to an embodiment of the disclosure.

Below, it will be described by way of examples with reference to FIGS. 4 and 5 that the processor 103 of the display apparatus 100 identifies the operation cycle of the optical sensor 102 based on the IR signal corresponding to the user key input In a state that an IR signal corresponding to a user key input is not received, the optical sensor 102 may implement a light sensing function on a predetermined operation cycle. For example, as shown in FIG. 4, the optical sensor 102 may iteratively perform the detection operation on an operation cycle of 400 msec (see the graph 420 in FIG. 4) while the IR signal corresponding to the user key input is not being received in the display apparatus 100 (see the graph 410 in FIG. 4).

Meanwhile, when it is identified that the IR signal corresponding to the user key input has been received or will be received, the processor 103 of the display apparatus 100 according to an embodiment of the disclosure identifies an operation cycle of the optical sensor 102, which is shorter than the idle section of the IR signal and includes at least the part of the section for the detection operation of the optical sensor 102, based on the identified operation cycle. A detailed method of identifying whether the IR signal has been received or will be received corresponding to the user key input will be described later with reference to FIGS. 8 to 10.

Figure 5:
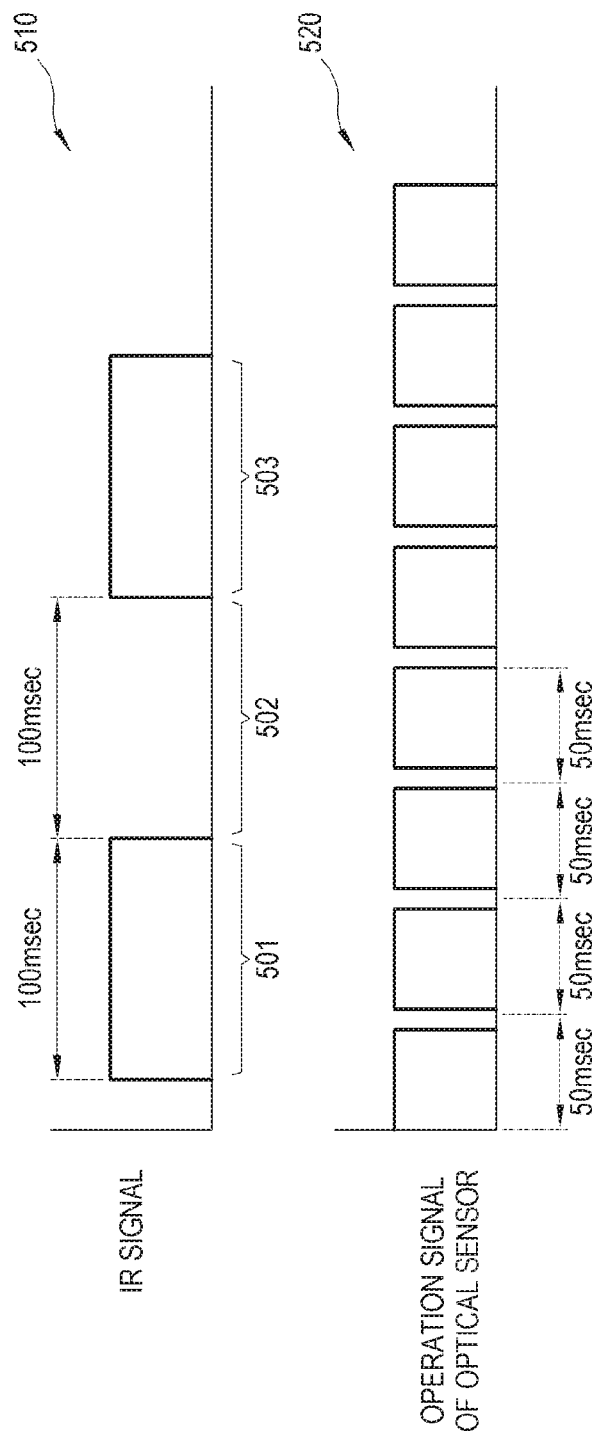

For example, when a signal is received like the graph 510 of FIG. 5 as the IR signal corresponding to the user key input, the processor 103 identifies the corresponding signal has an idle section of 100 msec by a method of directly detecting the corresponding signal, a method of obtaining and analyzing information about the corresponding signal or the like method, and then identifies the operation cycle of the optical sensor 102 as 50 msec to be shorter than the idle section but longer than a unit operation cycle in which the optical sensor 102 can perform the detection operation. Here, 50 msec is given by way of example. Besides, the processor 103 may identify any operation cycle as the operation cycle as long as it is shorter than the idle section of the IR signal but longer than the unit operation cycle of the optical sensor 102. A method of identifying the idle section of the IR signal by the processor 103 will be described later with reference to FIGS. 8 to 10.

After identifying the operation cycle as described above, the processor 103 may control the optical sensor 102 to repetitively perform the detection operation on the identified operation cycle. In other words, the optical sensor 102 in this embodiment performs the detection operation on a newly identified operation cycle of 50 msec switched from a previous operation cycle of 400 msec (see the graph 520 in FIG. 5).

When the operation cycle of the optical sensor 102 is switched from 400 msec over to 50 msec as described above after receiving the IR signal corresponding to the user key input, the optical sensor 102 can have an effect on detecting light around the display apparatus 100 within the idle section, i.e. within a section that does not correspond to the signal section of the IR signal.

This effect means that there is a section in which the optical sensor 102 can detect light around the display apparatus 100 normally according to its purposes without being influenced by an IR signal even though the IR signal is emitted from the remote controller 200 or the IR emitter 104 while a user is using the remote controller 200 to control the display apparatus 100.

Such an effect is more helpful in a case where a user uses the remote controller 200 to make successive control for the display apparatus 100, e.g. volume control or channel change of a TV, or other neighboring electronic apparatuses 300 (for example, set a temperature of an air conditioner). In such a case, it may take several seconds to dozens of seconds from start to finish of a user's successive control using the remote controller 200. The reasons why the foregoing effect is more helpful in such a case is because the display apparatus 100 according to the disclosure can normally detect surrounding conditions through the optical sensor 102 and perform operation based on the detection without malfunction caused by the IR signal emitted from the remote controller 200 even though a user makes the successive control using the remote controller 200. That is all the more so because the operation based on the optical sensor 102 in the display apparatus 100 (for example, automatic change in display brightness depending on ambient illuminance change) may be actually finished for several seconds to dozens of seconds for which a user makes the successive control if the disclosure is not applied.

Thus, it is convenient for a user to use the display apparatus 100 because the functions based on the optical sensor 102 of the display apparatus 100 are normally implemented even while the user is using the remote controller 200 to control the display apparatus 100.

Meanwhile, when the operation cycle of the optical sensor 102 is changed according to the foregoing embodiments, light around the display apparatus 100 is detected within the idle section of the IR signal without being influenced by the IR signal. Although the optical sensor 102 operates on the changed operation cycle, detection is still influenced by the IR signal when the light is detected within the signal section of the IR signal. Therefore, a value detected in this signal section needs to be excluded. A processing method for the exclusion will be described below with reference to FIGS. 6 and 7.

Figure 7:
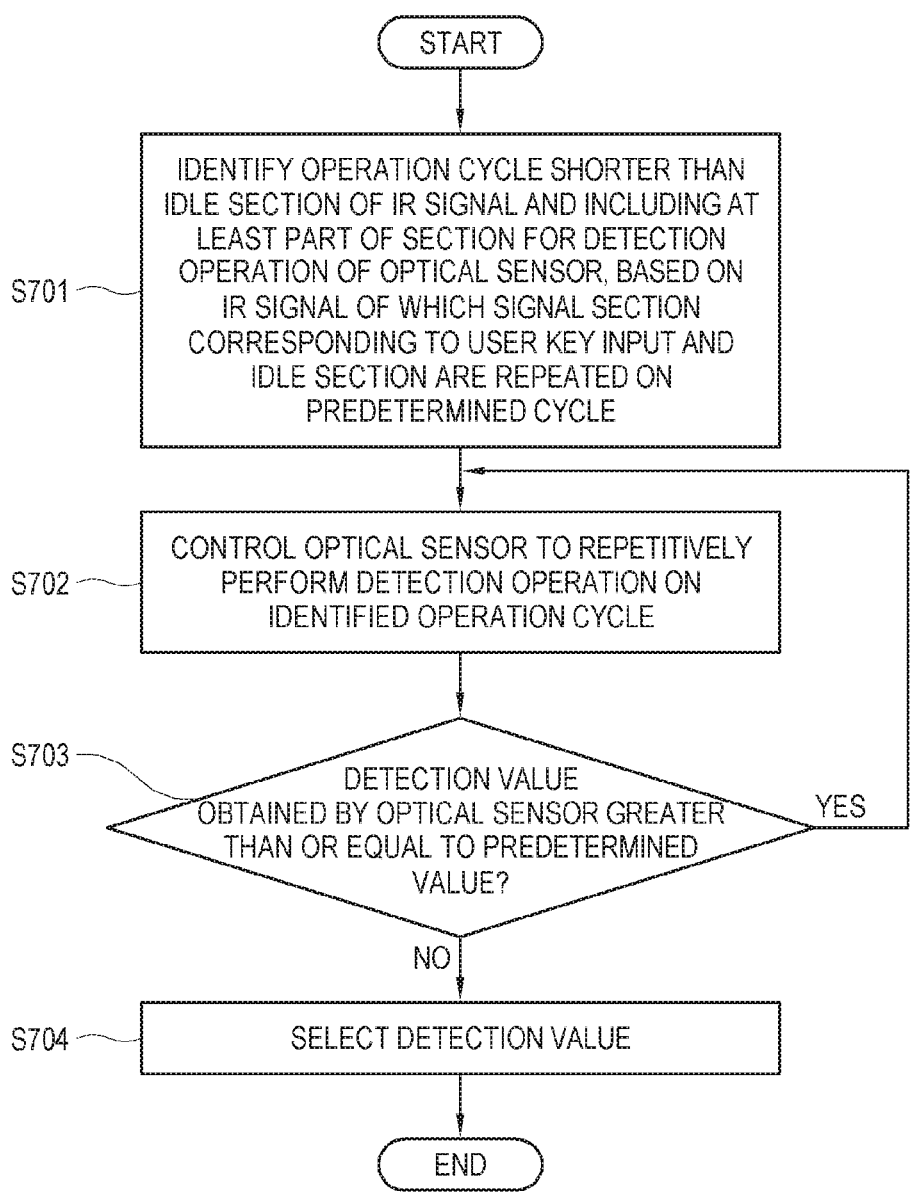

Referring to FIG. 7, as described above, the processor 103 of the display apparatus 100 identifies an operation cycle, which is shorter than an idle section of an IR signal and includes at least a part of a section for detection operation of the optical sensor 102, in response to the IR signal of which a signal section corresponding to a user key input and the idle section are repeated on a predetermined cycle (S701), and controls the optical sensor 102 to repetitively perform the detection operation on the identified operation cycle (S702).

Then, the processor 103 of the display apparatus 100 according to an embodiment of the disclosure identifies whether the detection value obtained by the detection operation of the optical sensor 102 changed in the operation cycle as described above is greater than or equal to a predetermined value (S703), and selects only the detection value lower than the predetermined value (S704) or controls the optical sensor 102 to perform the detection operation again without selecting the detection value greater than or equal to the predetermined value (S702). Here, the predetermined value refers to a reference value for distinguishing whether or not the detection value obtained by the optical sensor 102 has been influenced by the IR signal corresponding to the user key input, which may be statistically set based on an experiment and the like that the optical sensor 102 detects the IR signal of the remote controller 200, may be previously set when the display apparatus 100 is released, or may be set by a user. However, there are no specific limits to the setting method and the numerical value.

Figure 6:
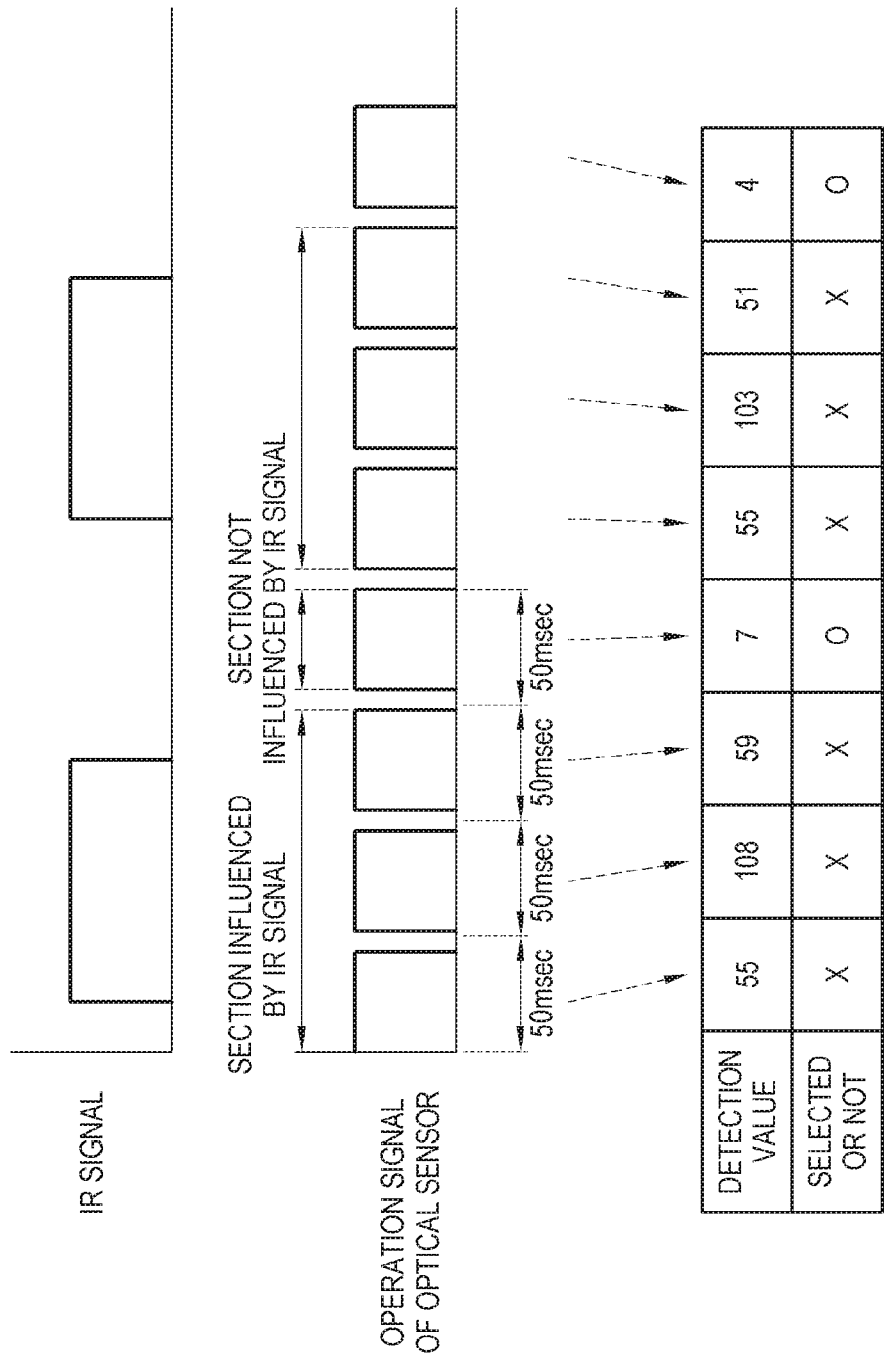
FIGS. 6 and 7 show examples of selecting a valid value among detection values obtained by an optical sensor of which an operation cycle is varied depending on operation of a display apparatus according to an embodiment of the disclosure.

Referring to FIG. 6, a detailed example is as follows. When 50 msec is obtained as a result from identifying the operation cycle in response to the IR signal corresponding to the user key input and thus the operation cycle of the optical sensor 102 is changed, the processor 103 identifies a detection value obtained by the optical sensor 102 on every operation cycle, selects only a detection value lower than for example '30' without selecting a detection value greater than or equal to '30', and performs a predetermined operation based on the selected detection value. Here, the value of '30' used as reference for the identification may be set based on experimental results and/or statistical data that, when the optical sensor 102 is for example an illumination sensor, it is generally very rare that a value obtained by detecting light around the display apparatus 100 with the illumination sensor is greater than '30' and the value of '30' is possible only when the IR signal emitted from the remote controller 200 is detected. However, the reference numerical value and the set method are not limited to this example.

Meanwhile, the detailed method of identifying that the IR signal corresponding to the user key input has been received or will be received, and the detailed method that the processor 103 identifies the idle section of the IR signal will be described with reference to FIGS. 8 to 10.

Figure 8:
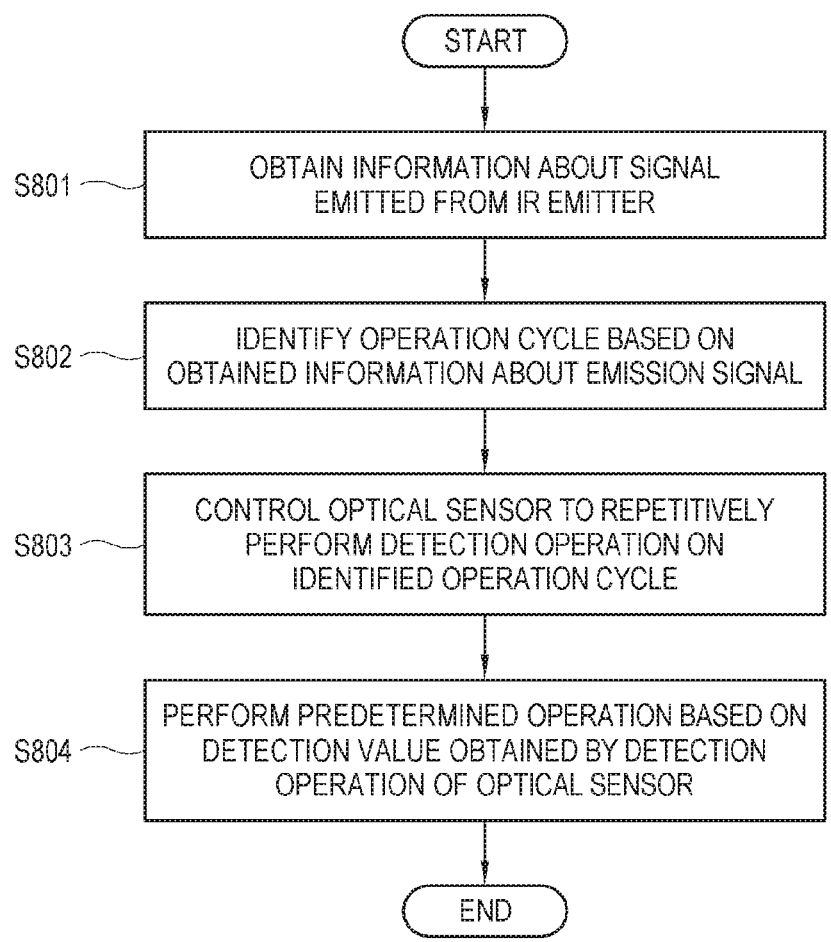
FIGS. 8 and 9 show examples that a display apparatus according to an embodiment of the disclosure identifies an operation cycle of an optical sensor.

FIGS. 8 and 9 illustrate an example that the display apparatus 100 according to an embodiment of the disclosure identifies the operation cycle of the optical sensor 102. In this embodiment, the IR emitter 104 is provided in the display apparatus 100.

When the IR emitter 104 is provided in the display apparatus 100 according to an embodiment of the disclosure, the processor 103 identifies when the IR emitter 104 starts and finishes emitting the IR signal corresponding to the user key input, based on information provided by the IR emitter 104. In other words, the processor 103 obtains information about the signal emitted from the IR emitter 104, from the IR emitter 104 (801), and identifies the operation cycle based on the obtained information about the emitted signal (802).

For example, when information about whether the IR is emitted from the IR emitter 104 is given using a flag variable, the processor 103 may identify whether and when the IR is emitted from the IR emitter 104 based on the flag variable. Alternatively, when the information about whether the IR is emitted from the IR emitter 104 is given through a general purpose input/output (GPIO) signal value, the processor 103 may identify whether and when the IR is emitted from the IR emitter 104 with reference to the GPIO signal value. Specifically, while continuously referring to the flag variable value (or the GPIO signal value), the processor 103 may for example identify a point in time when the foregoing value is switched from '0' over to '1' and identify that the IR emitter 104 starts emitting the IR at the corresponding point in time, and identify a point in time when the foregoing value is switched from '1' over to '0' and identify that the IR emitter 104 stops emitting the IR at the corresponding point in time.

With the foregoing operation, the processor 103 identifies whether the IR signal is emitted from the IR emitter 104 and when the IR emission is started and finished. Further, the processor 103 identifies the signal section and the idle section of the IR signal emitted from the IR emitter 104, and identifies the operation cycle shorter than the idle section of the IR signal and including at least a part of the section in which the detection operation of the optical sensor 102 will be performed, based on the identified signal and idle sections (S802).

In other words, the processor 103 according to an embodiment, as shown in FIG. 9, obtains information about emission of an IR signal from the IR emitter 104, and controls the operation cycle of the optical sensor 102 based on the obtained information.

Thus, the display apparatus 100 with the built-in IR emitter 104 can correctly identify information about the IR signal corresponding to the user key input, and is improved in reliability of identifying the operation cycle to be changed for the optical sensor 102.

Figure 10:
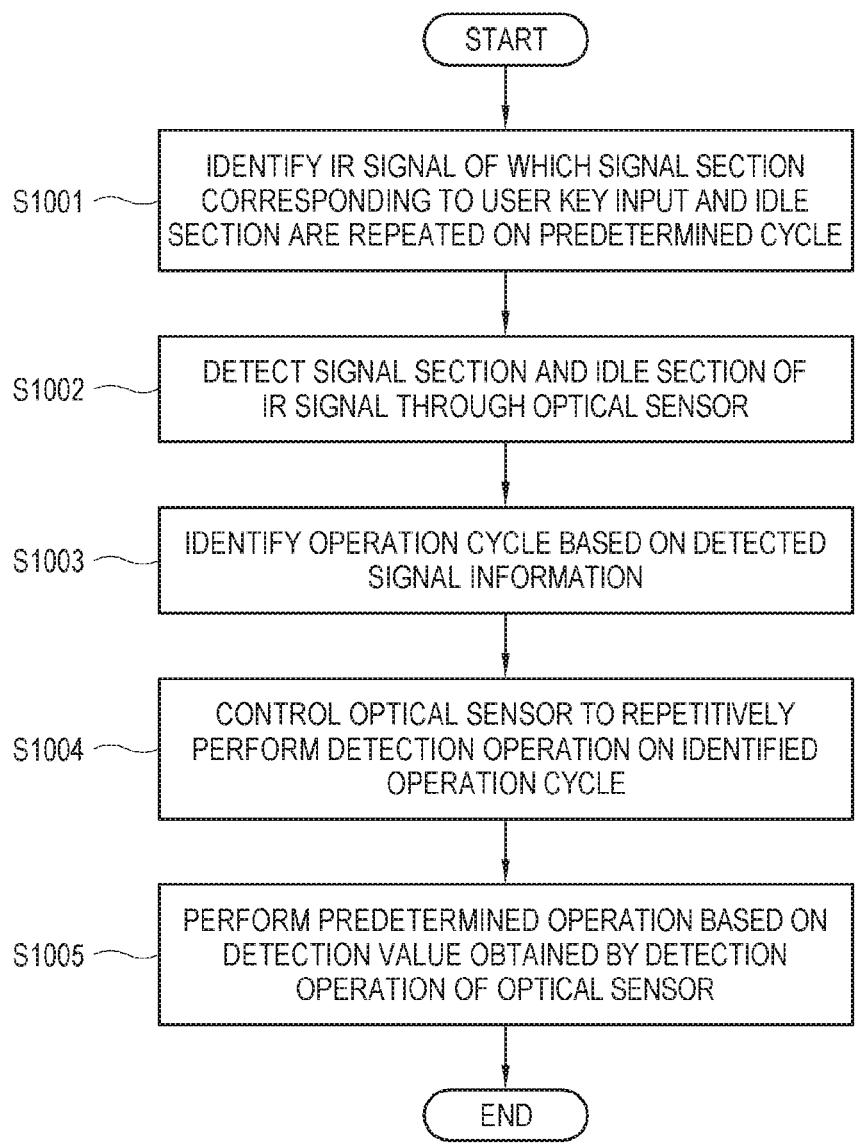
FIG. 10 shows another example that a display apparatus according to an embodiment of the disclosure identifies an operation cycle of an optical sensor.

FIG. 10 shows another example that a display apparatus according to an embodiment of the disclosure identifies an operation cycle of an optical sensor. This embodiment relates to a case where the IR signal is emitted from the remote controller 200 placed outside the display apparatus 100.

When the IR signal is emitted from the remote controller 200 placed outside the display apparatus 100, the optical sensor 102 receives the IR signal emitted toward the display apparatus 100 and thus the processor 103 identifies whether the signal detected by the optical sensor 102 is not a signal caused by general light around the display apparatus 100 but the IR signal corresponding to the user key input (S1001). This identification may be achieved by identifying whether the detection value obtained by the optical sensor 102 is greater than or equal to a predetermined value as described above with reference to FIGS. 6 and 7, or whether there is a rapid change in an IR channel value of the optical sensor 102, specifically, based on a method of comparing a differential value of the detection value of an IR channel of the optical sensor 102 with a previous differential value, or the like method.

Further, as a method of enhancing reliability of identifying the IR signal, the processor 103 may identify that the IR signal is emitted when any specific light is not detected in red, green and blue channels among the channels of the optical sensor 102 but light of a predetermined value or higher is detected in the IR channel.

When it is identified that the IR signal is received, the processor 103 further detects the signal section and the idle section of the IR signal (S1002). A method of detecting the signal section and the idle section of the IR signal may be the same as a method based on the foregoing operation S1001 of identifying the IR signal.

The processor 103, which detects the signal section and the idle section of the IR signal, may identify the operation cycle of the optical sensor 102 based on the detected signal information (S1003), control the optical sensor 102 based on the identified operation cycle (S1004), and perform a predetermined operation based on the detection value obtained by the optical sensor 102 (S1005).

Thus, it is possible to identify the operation cycle to be changed for the optical sensor 102 even though the IR signal corresponding to the user key input is received from the outside of the display apparatus 100.

Meanwhile, when the operation cycle of the optical sensor 102 becomes shorter than a previous operation cycle, an absolute value of the detection value obtained by the optical sensor 102 may be lowered during the corresponding cycle, and thus a problem may arise in continuously providing the function using the optical sensor 102 on the previous operation cycle. Therefore, there may be a need of compensating the detection value obtained by the optical sensor 102 as the operation cycle of the optical sensor 102 is varied. Below, a method of compensating the detection value will be described with reference to FIGS. 11 and 12.

Figure 11:
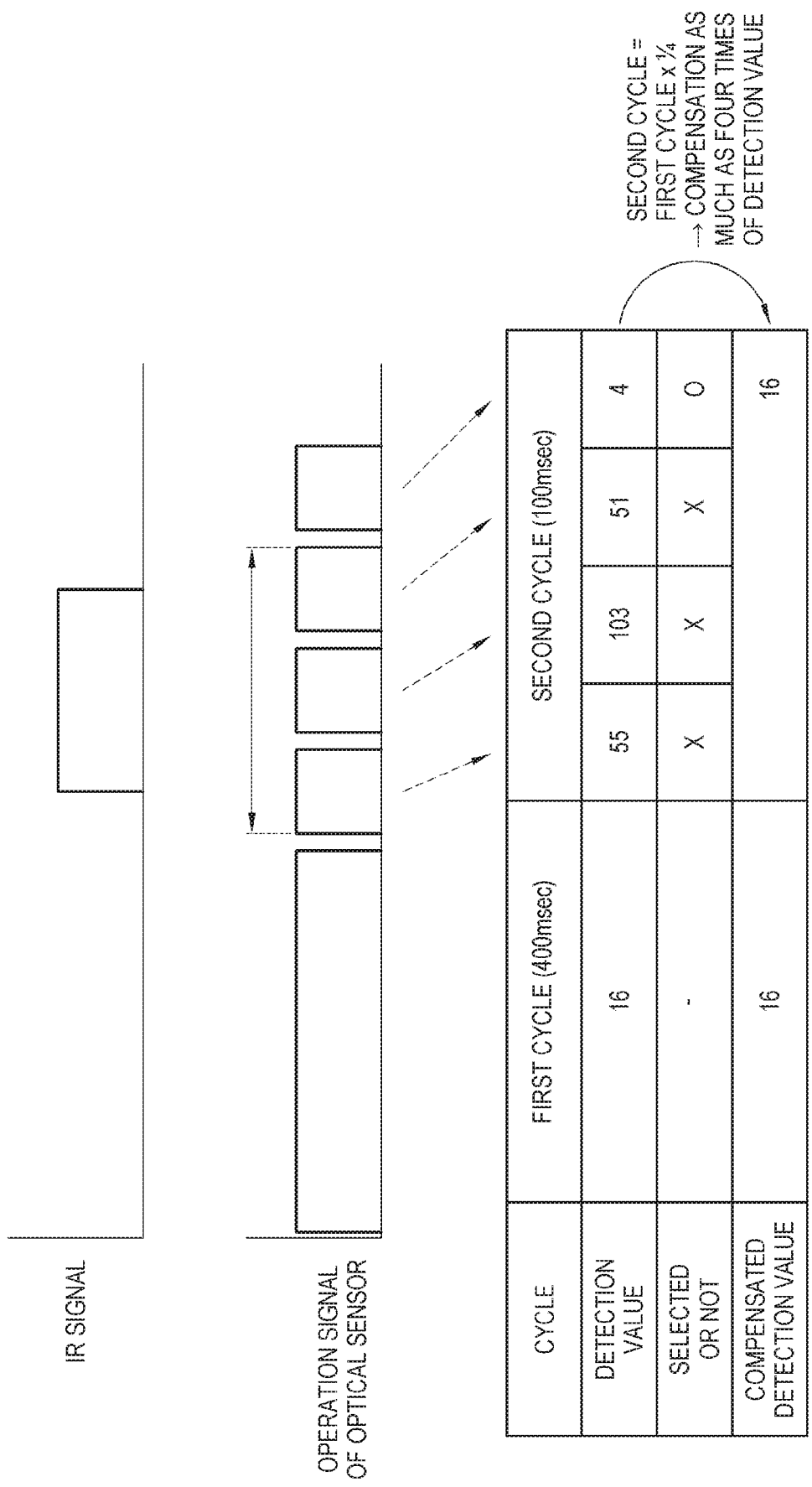
FIG. 11 shows an example of applying a compensation method to a value detected by an optical sensor of a display apparatus according to an embodiment of the disclosure.

FIG. 11 shows an example of applying a compensation method to a value detected by an optical sensor of a display apparatus according to an embodiment of the disclosure. FIG. illustrates that, in response to the IR signal corresponding to the user key input, the operation cycle of the optical sensor 102 is switched over from a first operation cycle of 400 msec to a second operation cycle of 100 msec corresponding to ¼ of the first operation cycle.

Referring to FIG. 11, the second operation cycle of 100 msec is shorter by ¼ than the first operation cycle of 400 msec, and therefore a detection value obtained by the optical sensor 102, e.g. by the illumination sensor operating on the second operation cycle may be lowered in proportion to a shortened cycle, i.e. lowered into a value smaller by ¼ than the detection value obtained by the optical sensor 102 operating on the first operation cycle, as the operation cycle becomes shorter, even though there are no change in illumination of light around the display apparatus 100. However, one of major aspects of the disclosure is to continuously provide the function of the display apparatus 100 using the optical sensor 102 by not terminating but continuously operating the optical sensor 102 even though the IR signal corresponding to the user key input is present. Therefore, there is a need of making the optical sensor 102 detect the same detection value under the same ambient illumination even though the operation cycle of the optical sensor 102 is switched from the first operation cycle over to the second operation cycle.

To this end, for example, the processor 103 may compensate a detection value with a value obtained by multiplying the detection value obtained by the optical sensor 102 operating on the second operation cycle by an inverse value of a value corresponding to how much the second operation cycle is shorter than the first operation cycle. For example, as shown in FIG. 11, when the optical sensor 102 operating on the second operation cycle obtains a detection value of '4' and the second operation cycle is equal to ¼ of the first operation cycle, the processor 103 may change the detection value into '16' by multiplying the detection value of '4' obtained by the optical sensor 102 operating on the second operation cycle with '4' corresponding to an inverse value of '¼', i.e. a ratio of the second operation cycle to the first operation cycle.

Thus, the function of the display apparatus 100 using the optical sensor 102 may be continuously provided even though the operation cycle of the optical sensor 102 is varied.

Figure 12:
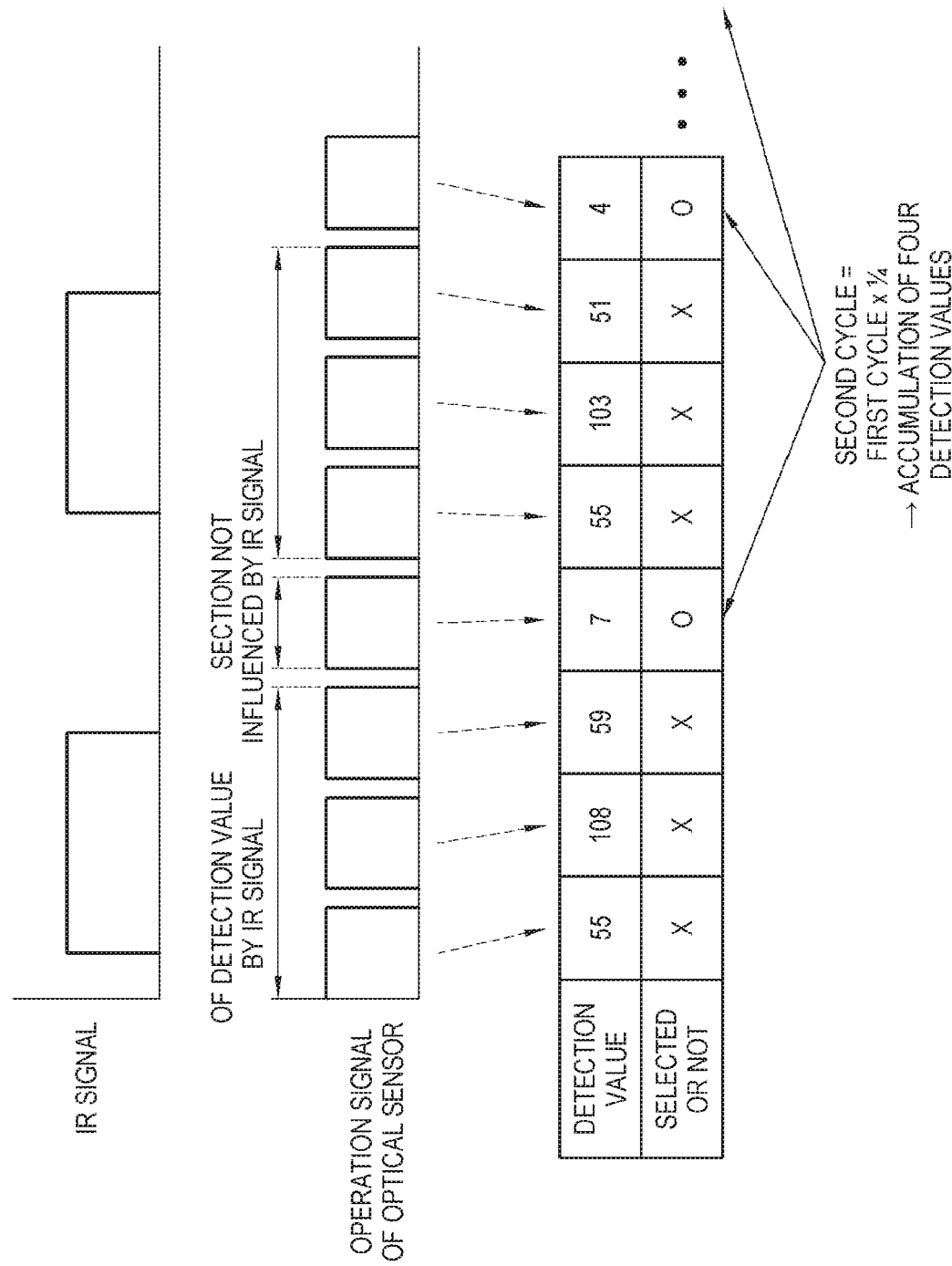
FIG. 12 shows another example of applying a compensation method to a value detected by an optical sensor of a display apparatus according to an embodiment of the disclosure.

FIG. 12 shows another example of applying a compensation method to a value detected by an optical sensor of a display apparatus according to an embodiment of the disclosure. As another method of compensating the detection value obtained by the optical sensor 102 so as not to be influenced by variation in the operation cycle, the processor 103 may compensate the detection value based on accumulation of a plurality of detection values throughout a plurality of cycles. Specifically, the processor 103 may accumulate the plurality of detection values corresponding to an inverse value of a value corresponding to how much the second operation cycle is shorter than the first operation cycle, thereby compensating the detection value obtained by the optical sensor 102 operating on the second operation cycle.

For example, like the example of FIG. 11, when the operation cycle of the optical sensor 102 is switched over to the second operation cycle of 100 msec corresponding to ¼ of the first operation cycle in response to the IR signal corresponding to the user key input while the optical sensor 102 operates on the first operation cycle of 400 msec, the processor 103 may, as shown in FIG. 12, draw a detection value of a corresponding section based on a value obtained by accumulating four detection values obtained by the optical sensor 102 operating on the second operation cycle and selected by the processor 103.

Thus, the function of the display apparatus 100 using the optical sensor 102 may be continuously provided even though the operation cycle of the optical sensor 102 is varied.

Figure 13:
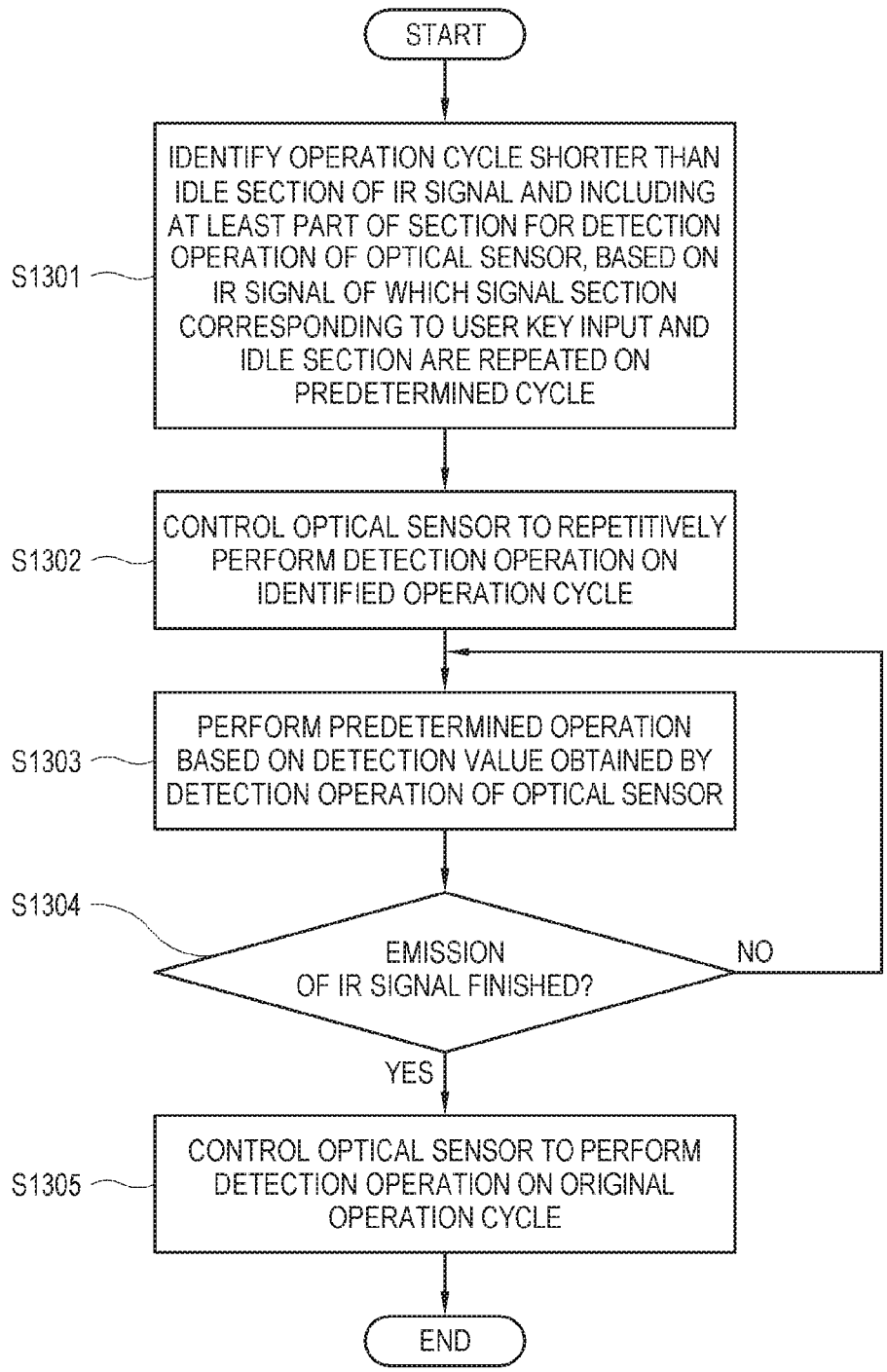
FIG. 13 shows an example of returning an operation cycle of an optical sensor to its original state in a display apparatus according to an embodiment of the disclosure.

FIG. 13 shows an example of returning an operation cycle of an optical sensor to its original state in a display apparatus according to an embodiment of the disclosure.

Although the operation cycle of the optical sensor 102 is switched from the first operation cycle over to the second operation cycle as the IR signal corresponding to the user key input is emitted from the remote controller 200 or the IR emitter 104 of the display apparatus 100, there may be a need of returning the operation cycle of the optical sensor 102 to the first operation cycle again without continuously maintaining the switched second operation cycle when the remote controller 200 or the IR emitter 104 of the display apparatus 100 stops emitting the IR signal corresponding to the user key input. The reason why there is a need of returning to the first operation cycle may be because detection reliability and the like of when the optical sensor 102 operates on the second operation cycle shorter than the first operation cycle is lower than those of the operation on the first operation cycle.

In other words, the processor 103 first identifies the operation cycle shorter than the idle section of the IR signal and including at least a part of a section for the detection operation of the optical sensor 102, as described above, based on the IR signal of which the signal section corresponding to the user key input and the idle section are repeated on a predetermined cycle (S1301), controls the optical sensor 102 to iteratively perform the detection operation on the identified operation cycle (1302), and perform a predetermined operation based on the detection value obtained by the detection operation of the optical sensor (S1303).

Further, the processor 103 identifies whether the emission of the IR signal corresponding to the user key input is finished (S1304), and controls the optical sensor 102 to perform the detection operation on the original operation cycle, i.e. the first operation cycle when it is identified that the emission of the IR signal is finished. In this case, as described above with reference to FIGS. 8 to 10, it may be identified whether the emission of the IR signal corresponding to the user key input is finished or not, based on the GPIO signal value of the IR emitter 104 of the flag variable when it is identified that the IR emitter 104 is provided in the display apparatus 100 and emits the IR signal, or by a method that the processor 103 directly identifies the IR signal through the optical sensor 102.

Thus, it is possible to return to the original operation cycle of the optical sensor 102 when the emission of the IR signal corresponding to the user key input is finished, thereby improving the reliability in the detection operation of the optical sensor 102.

Figure 14:
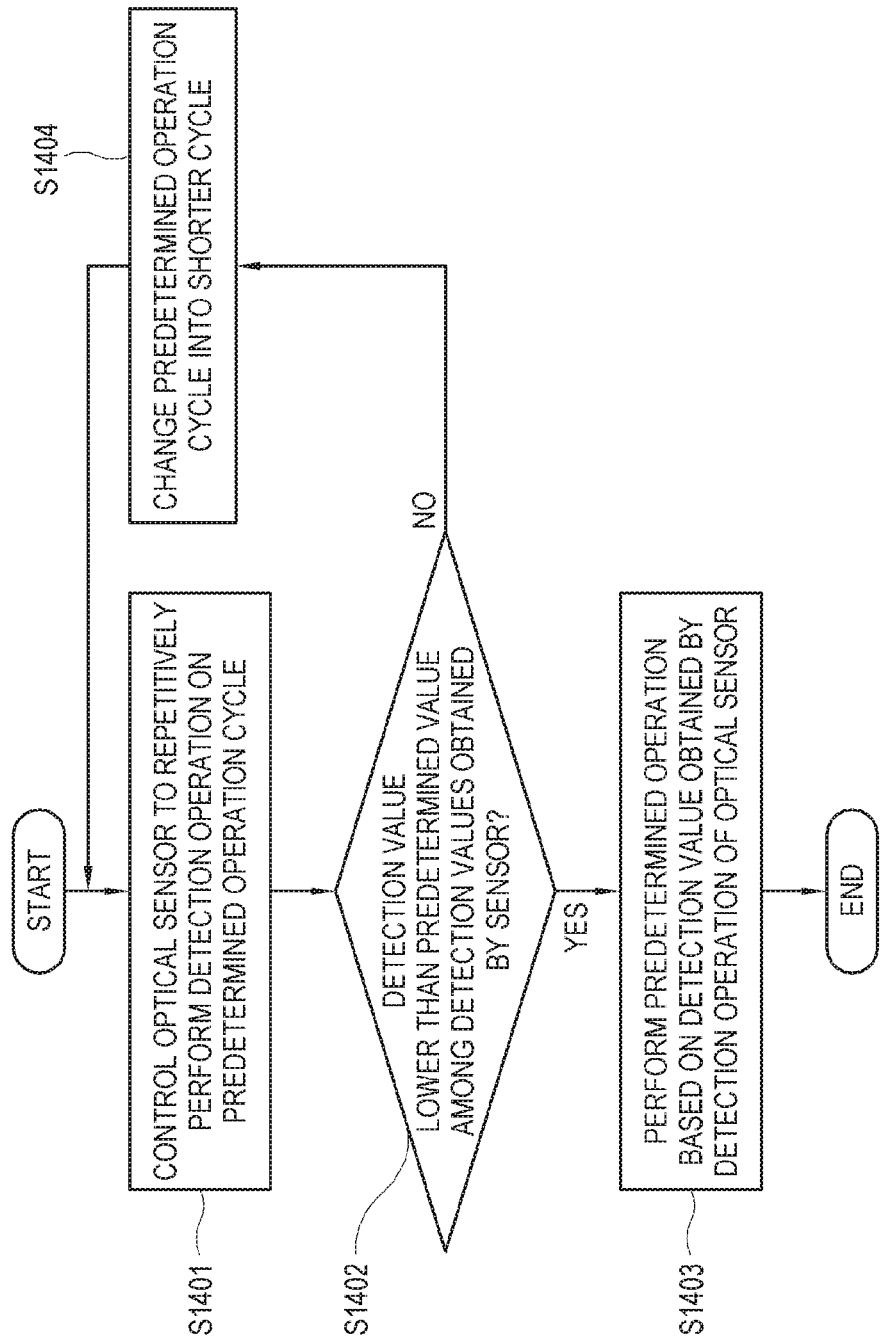
FIG. 14 shows another example that a display apparatus according to an embodiment of the disclosure changes an operation cycle of an optical sensor.

FIG. 14 shows another example that a display apparatus according to an embodiment of the disclosure changes an operation cycle of an optical sensor. The processor 103 of the display apparatus 100 in this embodiment identifies the operation cycle of the optical sensor 102 while stepwise changing the operation cycle of the optical sensor 102, in response to the IR signal corresponding to the user key input.

According to the optical sensors 102, the operation cycle in which the optical sensor 102 can operate may be set with several values. For example, a predetermined optical sensor 102 may be an optical sensor 102 which supports only four operation cycles of 400 msec, 200 msec, 100 msec and 50 msec for the detection operation according to purposes of use.

In this case, the processor 103 does not have to identify the idle section of the IR signal in response to the IR signal corresponding to the user key input, but identifies the operation cycle by identifying whether at least one unit detection is performable within the idle section of the IR signal at operation on a changed operation cycle while stepwise shortening the operation cycle in sequence from the initial operation cycle of 400 msec of the optical sensor 102.

Specifically, the processor 103 first controls the optical sensor 102 to repetitively perform the detection operation on a predetermined operation cycle, for example, a cycle of 400 msec (S1401), and identifies whether at least one unit detection is performable within the idle section of the IR signal at operation on the predetermined operation cycle. As a specific example of the identification method, the processor 103 identifies whether there is a detection value lower than a predetermined value among the detection values obtained by the sensor (S1402). When there is a detection value lower than the predetermined value, it means that there is a detection value obtained by detecting external environments without being influenced by the IR signal, and therefore the processor 103 performs a predetermined operation based on the detection value obtained by the detection operation of the optical sensor 102 without additionally changing the operation cycle (S1403). On the other hand, when there are no detection values lower than the predetermined value, the processor 103 changes the current operation cycle into the next-step shorter operation cycle and controls the optical sensor 102 (S1404). For example, when the current operation cycle is 400 msec, the processor 103 controls the optical sensor 102 to operate on a next-step operation cycle of 200 msec changed from the current operation cycle, and returns to the operation S1401 and repeats the operation following the operation S1401. When there are no detection values lower than the predetermined value even though the operation cycle is switched over to 200 msec, the operation cycle is switched over to 100 msec and operation following the operation S1401 is performed again. Nevertheless, when there are no detection values lower than the predetermined value, the operation cycle is switched over to 50 msec and the operation following the operation S1401 is performed again. Here, the change of the operation cycle in order of 400 msec, 200 msec, 100 msec and 50 msec is merely an example. This embodiment may include any example as long as the operation cycle is stepwise changed in order of shortening the operation cycle.

Meanwhile, the operation cycle of the optical sensor 102 may be changed by a similar method to that as described in the foregoing embodiment, i.e. by stepwise changing the operation cycle in order of not shortening but prolonging the operation cycle even when there is a need of returning to the original operation cycle as the emission of the IR signal corresponding to the user key input is finished.

Thus, it is possible to change the operation cycle of the optical sensor 102 into a proper cycle without identifying the idle section of the IR signal corresponding to the user key input, and make the operation cycle of the optical sensor 102 be suitable for situations.

Figure 15:
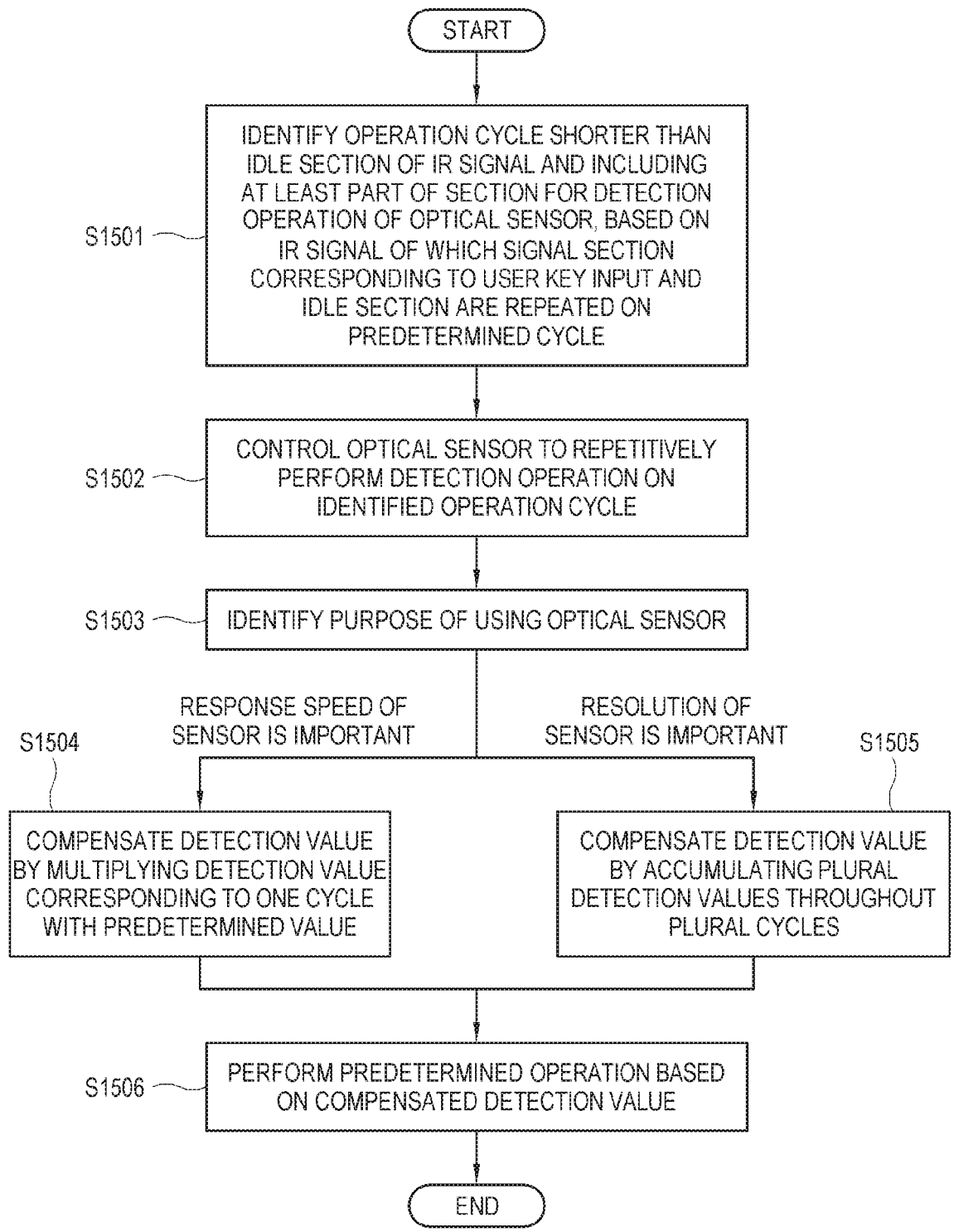
FIG. 15 shows another example of applying a compensation method to a value detected by an optical sensor of a display apparatus according to an embodiment of the disclosure.

FIG. 15 shows another example of applying a compensation method to a value detected by an optical sensor of a display apparatus according to an embodiment of the disclosure.

The methods of compensating the detection value drawn as the operation cycle of the optical sensor 102 is changed are respectively described above with reference to FIGS. 11 and 12. However, the method of compensating the detection value obtained by the optical sensor 102 is not limited to these examples. For example, according to an embodiment, the processor 103 may select and apply a proper compensation method according to the purposes of using the optical sensor 102 or the display apparatus 100 or ambient environments of the display apparatus 100.

Specifically, the processor 103 may first identify the second operation cycle shorter than the idle section of the IR signal and including at least a part of a section, in which the detection operation of the optical sensor 102 will be performed, in response to the IR signal of which the signal section corresponding to the user key input and the idle section are repeated as described above (S1501), and controls the optical sensor 102 to repeat the detection operation on the second operation cycle switched from the first operation cycle (S1502).

Then, the processor 103 identifies the purpose of using the optical sensor 102 (S1503). Further, the processor 103 may identify what characteristic has to be emphasized in terms of the identified purpose of using the optical sensor 102. For example, it may be identified which is important between a response speed and a resolution of the optical sensor 102 in terms of the corresponding purpose of use. In result, when it is identified that the response speed is important, the processor 103 compensates the detection value by multiplying the detection value obtained by the optical sensor 102 with an inverse value of a value corresponding to how much the second operation cycle is shorter than the first operation cycle (S1504). On the other hand, when it is identified that the resolution of the optical sensor 102 is more important than the response speed of the optical sensor 102 in terms of the corresponding purpose of use, the processor 103 compensates the detection value obtained by the optical sensor 102 operating on the second operation cycle by accumulating a plurality of detection values corresponding to an inverse value of a value corresponding to how much the second operation cycle is shorter than the first operation cycle (S1505). In the latter case, the plurality of detection values have to be accumulated, and therefore time taken in drawing one detection value increases, thereby lowering the response speed of the optical sensor 102, but drawing the detection value more accurately than that of the operation S1504 in which the detection value is compensated by multiplying one detection value with a predetermined value.

After compensating the detection value by the foregoing method, the processor 103 performs a predetermined operation based on the compensated detection value (S1506).

Thus, the detection value of the optical sensor 102 is compensated to be more adapted to the purpose of the optical sensor 102, thereby enhancing satisfaction of a user.

Figure 16:
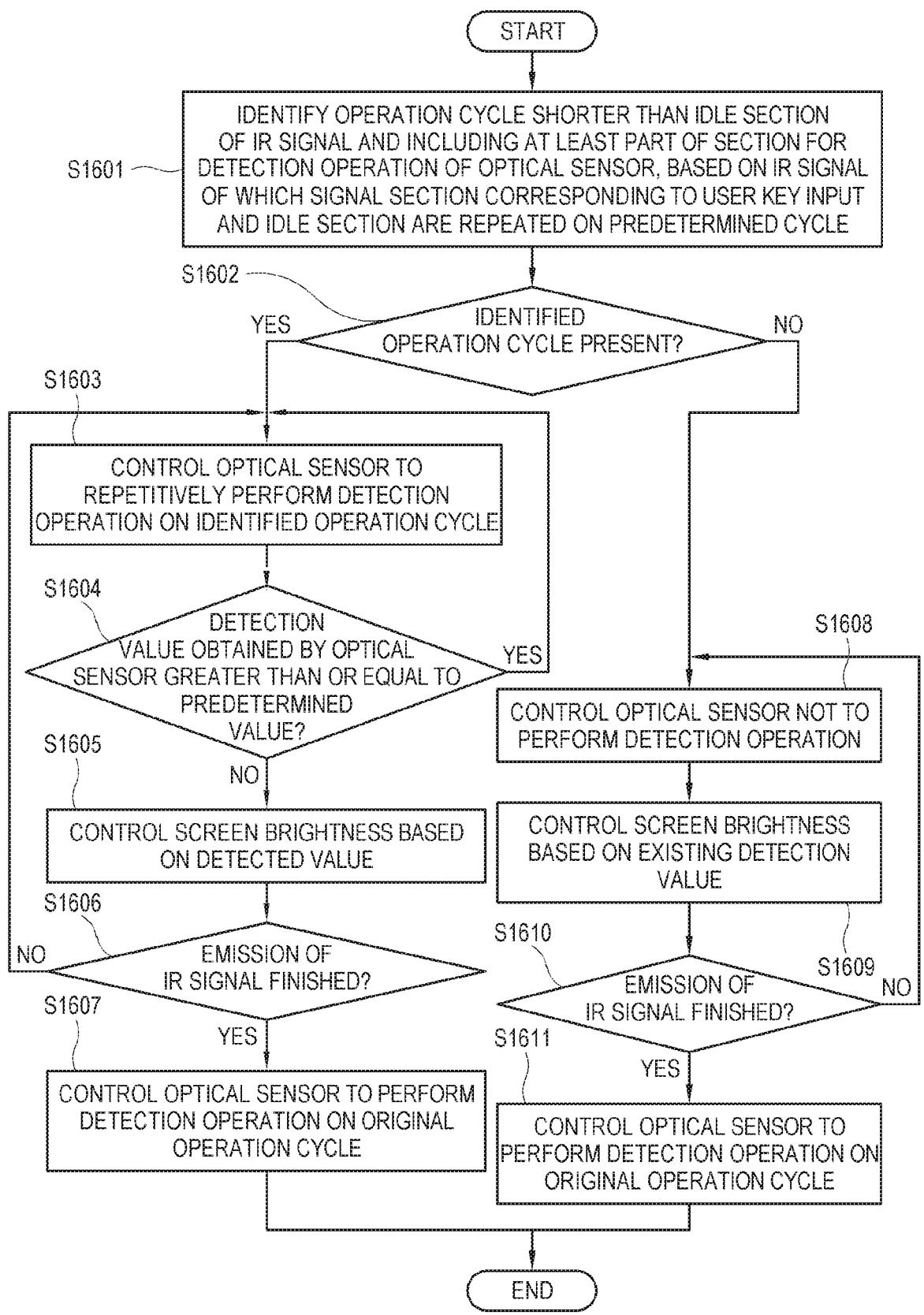
FIG. 16 shows operation of a display apparatus according to another embodiment of the disclosure.

FIG. 16 shows operation of a display apparatus according to another embodiment of the disclosure. This embodiment additionally discloses a method of preventing the optical sensor 102 from operating until the reception of the corresponding IR signal is finished, when the operation cycle is identified based on the IR signal corresponding to the user key input but there are no operation cycles shorter than the idle section of the IR signal and including at least a part of a section for the detection operation of the optical sensor 102.

Specifically, the processor 103 of the display apparatus 100 first identifies an operation cycle shorter than the idle section of the IR signal and including at least a part of a section for the detection operation of the optical sensor 102, in response to the IR signal of which the signal section corresponding to the user key input and the idle section are repeated on a predetermined cycle (S1601). Then, it is identified whether the identified operation cycle is present (S1602). When the identified operation cycle is present, i.e. when there is the operation cycle shorter than the idle section of the IR signal and including at least a part of a section for the detection operation of the optical sensor 102, the processor 103 may perform operation based on one of the foregoing embodiments or combination of various embodiments. For example, when the optical sensor 102 is the illumination sensor, the processor 103 controls the illumination sensor to repetitively perform the detection operation on the identified operation cycle (S1603), identifies whether the detection value obtained by the illumination sensor is greater than or equal to a predetermined value (S1604), and returns to the detection operation when the detection value is greater than or equal to the predetermined value, or controls screen brightness based on the detection value when the detection value is lower than the predetermined value (S1605). Then, it is identified whether the emission of the IR signal is finished (S1606), and the optical sensor 102 is controlled to perform the detection operation on the original operation cycle when the emission of the IR signal is finished (S1607).

On the other hand, when the identified operation cycle is not present, i.e. when there are no operation cycles shorter than the idle section of the IR signal and including at least a part of a section for the detection operation of the optical sensor 102, the processor 103 controls the optical sensor 102 not to perform the detection operation (S1608), and performs the screen brightness control function based on the existing detection value (S1609). Then, it is identified whether the emission of the IR signal is finished (S1610), and the optical sensor 102 is controlled to perform the detection operation again when the emission of the IR signal is finished (S1611).

Accordingly, the display apparatus 100 does not malfunction even though there are no operation cycles proper to change the operation cycle of the optical sensor 102 based on the IR signal corresponding to the user key input.

As described above, according to the disclosure, the display apparatus normally functions using the optical sensor even though the IR signal is present corresponding to the user key input.

Although a few exemplary embodiments have been described above with reference to the accompanying drawings, it will be appreciated by a person having an ordinary skill in the art that the embodiments may be actualized in different forms without changing their technical concept or essential features. Therefore, the foregoing embodiments are all for illustrative purposes only and should not be construed as limiting the disclosure.

What is claimed is:

1. A display apparatus comprising:
   a display;
   an optical sensor; and
   at least one processor configured to:
   identify, based on an infrared (IR) signal having a signal section corresponding to a user key input and an idle section repeated on a predetermined cycle, an operation cycle of the optical sensor that is shorter than or equal to half of the idle section and has at least a minimal length needed for the optical sensor to detect light according to a purpose for which the optical sensor is to be used and to obtain a detection value corresponding to the detected light,
   control the optical sensor to switch to the identified operation cycle from a previous operation cycle of the optical sensor, and to repetitively perform a detection operation based on the identified operation cycle, wherein the previous operation cycle of the optical sensor is longer than the idle section,
   select a detection value from among a plurality of detection values which are obtained on the identified operation cycle in the detection operation, wherein the selected detection value corresponds to the idle section of the IR signal, and
   perform a predetermined operation based on the selected detection value.

2. The display apparatus according to claim 1, wherein the at least one processor is configured to perform the predetermined operation based on the selected detection value being lower than or equal to a predetermined value.

3. The display apparatus according to claim 1, further comprising:
   an IR emitter,
   wherein the IR signal is an IR signal emitted from the IR emitter.

4. The display apparatus according to claim 1, wherein the optical sensor is configured to detect the IR signal, and the at least one processor is configured to identify the operation cycle based on the IR signal detected by the optical sensor.

5. The display apparatus according to claim 1, wherein the at least one processor is configured to compensate the selected detection value based on the identified operation cycle, and
   the at least on processor is configured to perform the predetermined operation based on the compensated detection value.

6. The display apparatus according to claim 1, wherein the IR signal is an IR signal being emitted from the display apparatus, and
   the at least one processor is further configured to:
   identify an end of the emission of the IR signal, and
   in response to identifying the end of the emission of the IR signal, control the optical sensor to perform the detection operation based on the previous operation cycle of the optical sensor instead of based on the identified operation cycle.

7. The display apparatus according to claim 1, wherein the at least one processor is configured to identify the operation cycle by stepwise changing a current operation cycle of the optical sensor.

8. The display apparatus according to claim 1, wherein the at least one processor is configured to differently compensate the selected detection value in accordance with the purpose for which the optical sensor is to be used, and
   the at least on processor is configured to perform the predetermined operation based on the compensated detection value.

9. A method comprising:
   by a display apparatus including an optical sensor,
   identifying, based on an infrared (IR) signal having a signal section corresponding to a user key input and an idle section repeated on a predetermined cycle, an operation cycle of the optical sensor that is shorter than or equal to half of the idle section and has at least a minimal length needed for the optical sensor to detect light according to a purpose for which the optical sensor is to be used and to obtain a detection value corresponding to the detected light;
   controlling the optical sensor to switch to the identified operation cycle from a previous operation cycle of the optical sensor, and to repetitively perform a detection operation based on the identified operation cycle, wherein the previous operation cycle of the optical sensor is longer than the idle section;
   selecting a detection value from among a plurality of detection values which are obtained on the identified operation cycle in the detection operation, wherein the selected detection value corresponds to the idle section of the IR signal, and
   performing a predetermined operation based on the selected detection value.

10. The method according to claim 9, wherein the performing of the predetermined operation comprises performing the predetermined operation based on the selected detection value being lower than or equal to a predetermined value.

11. The method according to claim 9, wherein:
   the display apparatus further comprises an IR emitter, and
   the IR signal is an IR signal emitted from the emitter.

12. The method according to claim 9, wherein:
   the optical sensor is configured to detect the IR signal, and the identifying of the operation cycle comprises identifying the operation cycle based on the IR signal detected by the optical sensor.

13. The method according to claim 9, further comprising: by the display apparatus,
compensating the selected detection value based on the identified operation cycle.

14. The method according to claim 9, wherein the IR signal is an IR signal being emitted, and the method further comprises:
by the display apparatus,
identifying an end of the emission of the IR signal, and
in response to identifying the end of the emission of the IR signal, controlling the optical sensor to perform the detection operation based on the previous operation cycle of the optical sensor instead of based on the identified operation cycle.

15. The method according to claim 9, wherein the identifying of the operation cycle comprises identifying the operation cycle by stepwise changing a current operation cycle of the optical sensor.

16. The method according to claim 9, further comprising: by the display apparatus,
differently compensating the selected detection value in accordance with the purpose for which the optical sensor is to be used,
wherein the performing the predetermined operation comprises performing the predetermined operation based on the compensated detection value.

17. A computer program stored in a non-transitory computer-readable medium that, when executed by a display apparatus that includes an optical sensor, causes the display apparatus to perform a process comprising:
identifying, based on an infrared (IR) signal having a signal section corresponding to a user key input and an idle section repeated on a predetermined cycle, an operation cycle of the optical sensor that is shorter than or equal to half of the idle section and has at least a minimal length needed for the optical sensor to detect light according to a purpose for which the optical sensor is to be used and to obtain a detection value corresponding to the detected light;
controlling the optical sensor to switch to the identified operation cycle from a previous operation cycle of the optical sensor, and to repetitively perform a detection operation based on the identified operation cycle, wherein the previous operation cycle of the optical sensor is longer than the idle section;
selecting a detection value from among a plurality of detection values which are obtained on the identified operation cycle in the detection operation, wherein the selected detection value corresponds to the idle section of the IR signal, and
performing a predetermined operation based on the selected detection value.

18. The computer program according to claim 17, wherein the computer program is stored in a medium of a server and is downloadable into the display apparatus through a network.

19. A display apparatus comprising:
a display;
an optical sensor; and
at least one processor configured to:
identify, based on an infrared (IR) signal having a signal section corresponding to a user key input and an idle section repeated on a predetermined cycle, an operation cycle of the optical sensor that is shorter than or equal to half of the idle section and has at least a minimal length needed for the optical sensor to detect light according to a purpose for which the optical sensor is to be used and to obtain a detection value corresponding to the detected light,
control the optical sensor to repetitively perform a detection operation based on the identified operation cycle, and
perform a predetermined operation based on a detection value obtained by the detection operation.

\* \* \* \* \*

UNITED STATES PATENT AND TRADEMARK OFFICE
CERTIFICATE OF CORRECTION

PATENT NO. : 11,277,576 B2
APPLICATION NO. : 16/591109
DATED : March 15, 2022
INVENTOR(S) : Yoo et al.

It is certified that error appears in the above-identified patent and that said Letters Patent is hereby corrected as shown below:

On the Title Page

Item (57), right Column, in Line 2 of the Abstract:
Delete "a display apparatus" and insert --A display apparatus--.

In the Claims

Column 18, Line 10:
In Claim 5, delete "on" and insert --one--.

Column 18, Line 31:
In Claim 8, delete "on" and insert --one--.

Signed and Sealed this
Second Day of August, 2022

Katherine Kelly Vidal
*Director of the United States Patent and Trademark Office*